United States Patent [19]

Christensen

[11] 4,396,132

[45] Aug. 2, 1983

[54] APPARATUS AND PROCESS FOR REMOVING AND DISPENSING LIQUID FROM A RECEPTACLE

[76] Inventor: Kurt K. Christensen, P.O. Box 918, Wichita, Kans. 67201

[21] Appl. No.: 292,881

[22] Filed: Aug. 14, 1981

[51] Int. Cl.³ ............................................. G01F 11/04
[52] U.S. Cl. ...................................... 222/1; 222/341; 222/380; 222/382; 222/384
[58] Field of Search .................. 222/1, 207, 211, 213, 222/340, 341, 380, 382, 384, 383; 239/321, 333

[56] References Cited

U.S. PATENT DOCUMENTS

| | | | |
|---|---|---|---|
| 3,187,960 | 6/1965 | Gorman | 222/383 X |
| 3,489,322 | 1/1970 | Ayres | 222/380 X |
| 3,527,551 | 9/1970 | Kutik et al. | 222/384 X |
| 3,753,518 | 8/1973 | Kutik | 222/383 |
| 3,785,532 | 1/1974 | Cooprider | 222/207 |
| 3,877,616 | 4/1975 | Stevens | 222/321 |
| 3,973,700 | 8/1976 | Schmidt et al. | 222/207 X |
| 4,225,061 | 9/1980 | Blake et al. | 222/383 X |
| 4,227,628 | 10/1980 | Parsons | 222/383 X |

Primary Examiner—F. J. Bartuska
Attorney, Agent, or Firm—John H. Widdowson

[57] ABSTRACT

A method and apparatus for removing and dispensing liquid from a receptacle. The apparatus includes a pump housing having a cylindrical fluid chamber, a coil spring within the fluid chamber, a coil spring within the fluid chamber to bias a piston which slidably traverses the inside wall of the fluid chamber, and an actuator button supported by the top of the piston. A bottom plug with a plug valve port, a plug intake port, a plug vent port, a plug shoulder, and a conduit boss engages the bottom of the pump housing. A tube connects to the boss to extend into the liquid within the receptacle. A cylindrical skirt rotatably lodges between the bottom of the pump housing and the plug shoulder for application to the neck of the receptacle. A diaphragm is interposed between the bottom of the pump housing and the bottom plug. The process includes pushing repeatedly downward the actuator button to draw liquid into the fluid chamber until the same is substantially full. The process additionally includes continuing to push downward the actuator button after the fluid chamber has become substantially full to bulge the diaphragm and allow the passage of liquid from the fluid chamber into the atmosphere.

11 Claims, 13 Drawing Figures

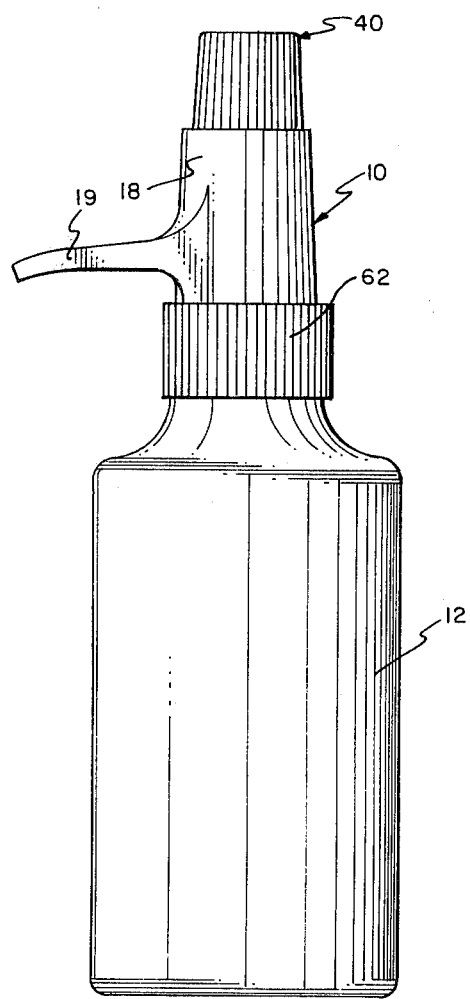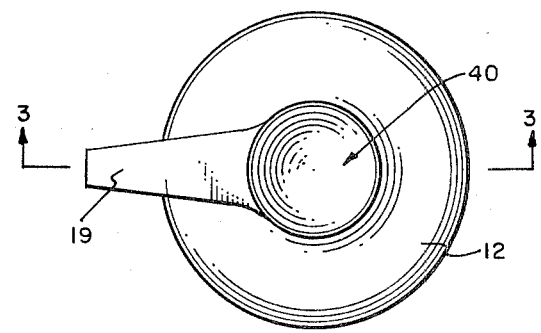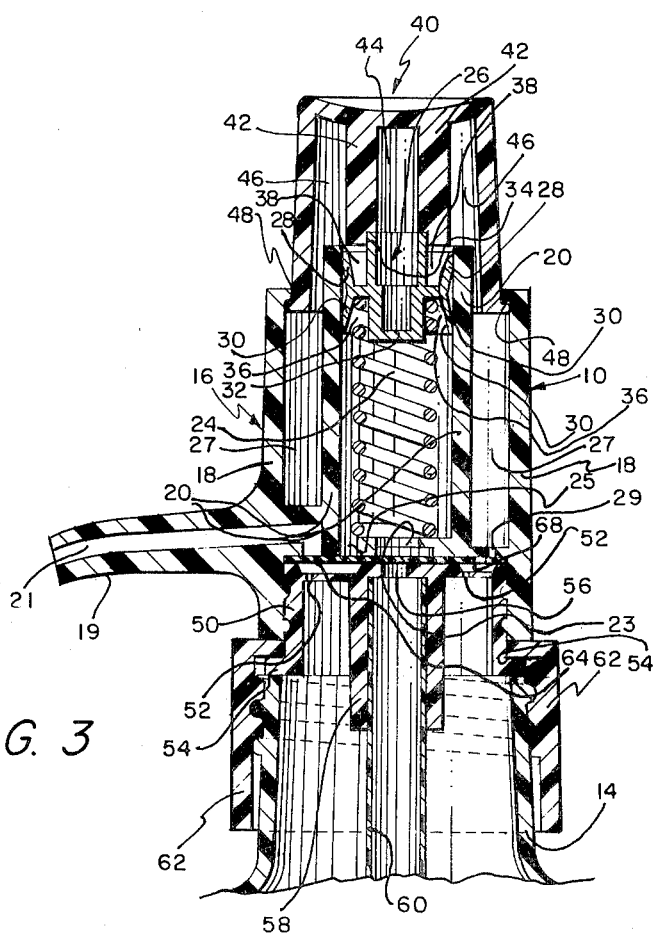

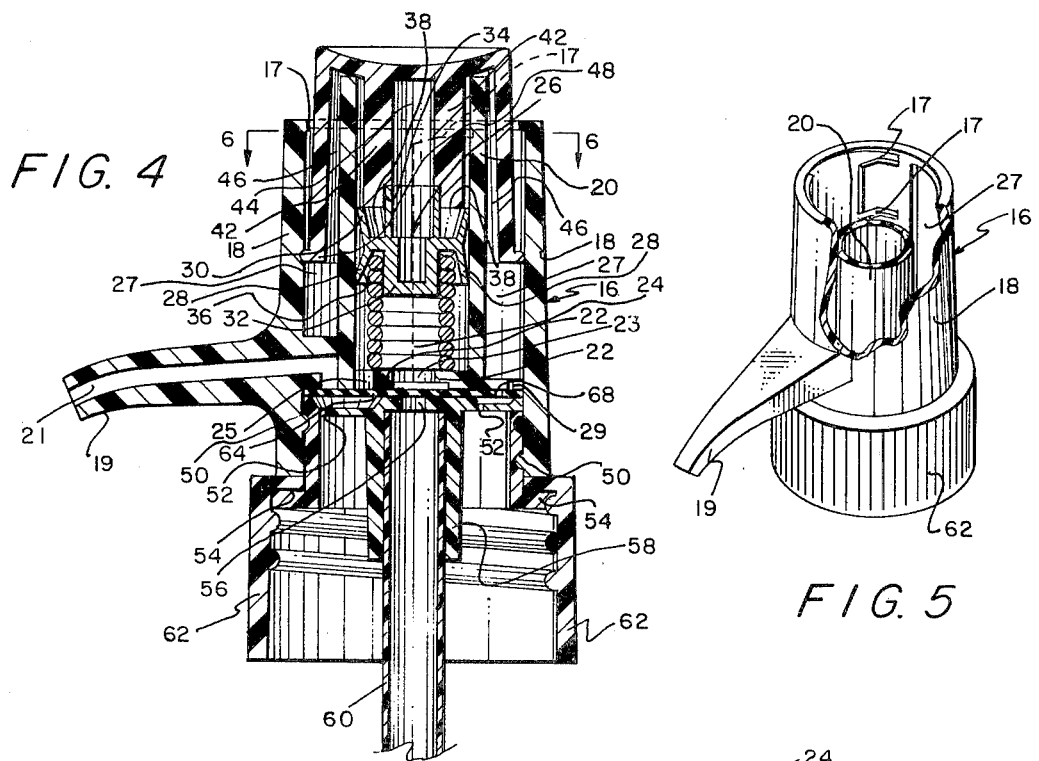
FIG. 4
FIG. 5
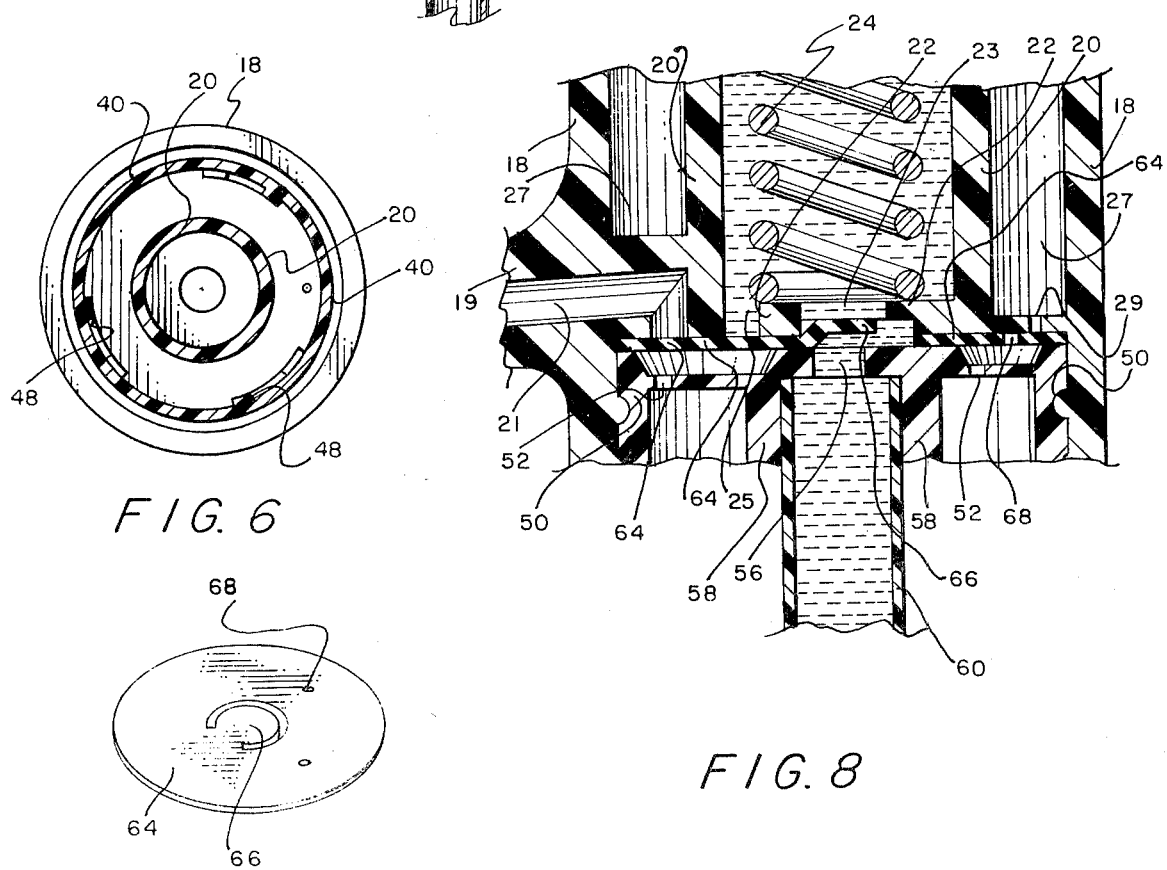
FIG. 6
FIG. 7
FIG. 8

APPARATUS AND PROCESS FOR REMOVING AND DISPENSING LIQUID FROM A RECEPTACLE

BACKGROUND OF THE INVENTION

1. Field of the Invention

This invention relates to a process and pump for removing and dispensing liquid from a receptacle.

2. Description of the Prior Art

U.S. Pat. Nos. 3,973,700 and 4,227,628 by Schmidt et al and Parsons, respectively, disclose dispensing pumps for containers which include flapper type valves. The following U.S. patents disclose dispensing pumps of the type utilizing flexible material diaphragm type valves in a dispensing pump assembly attached to the top of the container: U.S. Pat. No. 3,753,518 by Kutik; U.S. Pat. No. 3,785,532 by Cooprider; U.S. Pat. No. 3,187,960 by Gorman; and U.S. Pat. No. 3,877,616 by Stevens. None of the foregoing prior art patents teach or suggest the particular pump assembly of this invention.

SUMMARY OF THE INVENTION

This invention accomplishes its desired objects by providing a pump for removing and dispensing liquid from a receptacle including a pump housing having a generally cylindrical side. The pump housing has a structure defining an essentially cylindrical fluid chamber. A pump annulus is interposed between the cylindrical side and the fluid chamber. Formed integrally with the pump housing is a discharge spout having a discharge passage. The fluid chamber has a bottom evidencing a fluid intake port and fluid discharge port. Spring biased means is housed within the fluid chamber. A piston with a piston side snugly and slidably traverses the inside wall of the cylindrical fluid chamber. The spring biased means engages the bottom of the piston for biasing the piston away from the bottom of the fluid chamber. A generally cylindrical actuator button is supported by the top of the piston. A bottom plug engages the bottom of the pump housing and includes a structure evidencing at least one plug valve port, a plug vent port, a plug shoulder for sealing and mating with the top of the receptacle, a bottom plug intake port, and a depending conduit boss that extends axially downward and is in communication with the bottom plug intake port. A removable tube of sufficient length removably engages the conduit boss to reach nearly to the bottom of the receptacle with which the pump is associated for communication with the fluid product therein for the flow of the fluid from the receptacle into the fluid chamber of the pump housing for dispensation through the discharge passage of the discharge spout. A cylindrical skirt rotatably lodges between the bottom of the pump housing and the plug shoulder and is internally threaded or otherwise adpated for application to the open neck of the receptacle. A diaphragm means is interposed between the bottom of the pump housing and the bottom plug. Diaphragm means has a structure defining a diaphragm vent opening and a flap valve which pivotally covers the bottom plug intake port. The diaphragm means seals the discharge port of the fluid chamber to prevent communication of the discharge port with the discharge passage of the discharge spout when the fluid chamber is not substantially full with the fluid product and the actuator button is not depressed. The process comprises the steps of interposing the diaphragm means between the bottom of the pump housing and the bottom plug to seal off the communication of the fluid discharge of the fluid chamber and the discharge spout, and to seal the annulus venting port; pushing repeatedly downward the upwardly biased actuator button to cause the upward movement of the upwardly biased piston to open the flap valve and draw liquid through the removable tube, the plug intake port, through the fluid intake port into the fluid chamber until the same is substantially full; and pushing down the upwardly biased actuator button after the fluid chamber has become substantially full to close the flap valve and depress the portion of the diaphragm means covering the fluid discharge port to bulge the diaphragm means in order to open up communication between the fluid discharge passage to dispense liquid from the fluid chamber through the discharge passage.

It is an object of the invention to provide a novel process and apparatus for removing and dispensing liquid from a receptacle.

These, together with the various ancillary objects and features which will become apparent as the following description proceeds, are attained by this invention, a preferred embodiment being shown in the accompanying drawings, by way of example only, wherein:

BRIEF DESCRIPTION OF THE DRAWINGS

FIG. 1 is a side view of the invention attached to a receptacle;

FIG. 2 is a top plan view of FIG. 1;

FIG. 3 is a partial vertical sectional view taken in direction of the arrows and along the plane of line 3—3 in FIG. 2;

FIG. 4 is a vertical sectional view of the invention with the actuator button in a depressed position;

FIG. 5 is a partial perspective view of the invention with the actuator button, the piston and the coiled spring removed;

FIG. 6 is a horizontal sectional view taken in direction of the arrows and along the plane of line 6—6 in FIG. 4;

FIG. 7 is a perspective view of the diaphragm;

FIG. 8 is a partial enlarged vertical sectional view illustrating the flap valve open for the passage of fluid into the fluid chamber;

DETAILED DESCRIPTION OF THE INVENTION

Figure 11:
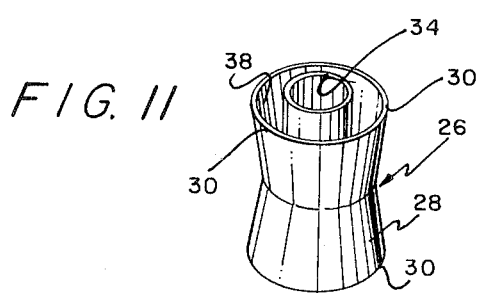
FIG. 11 is a perspective view of the piston.

Referring in detail now to the drawings, wherein like reference numerals designate similar parts throughout the various views, there is seen a pump, generally illustrated as 10, for removing and dispensing liquid from a receptacle 12 having a neck 14, and including a pump housing, generally illustrated as 16, with a cylindrical side 18 having notched recesses 17 on the inside thereof and with an integrally formed discharge spout 19 having a discharge passage 21. A cylindrical fluid chamber 20 having a fluid intake port 23 and a fluid discharge port 25 is coaxially postured within the pump housing 16. A pump annulus 27 with an annulus venting port 29 is interposed between cylindrical side 18 and fluid chamber 20. Fluid chamber 20 includes at the bottom thereof a plurality of interconnecting partitions 22 to distantly support from the immediate bottom of the fluid chamber 20 a coiled spring 24 which supports and upwardly biases on the top thereof a piston, generally illustrated as 26 (see FIG. 11), having a piston side 28 whose edges 30 snugly, slidably traverse the inside wall of the cylindrical fluid chamber 20. The piston 26 is also formed with a lower piston boss 32 and an upper piston boss 34. The lower piston boss 32 is circumscribed by the coiled spring 24 for biasing upwardly the piston 26 away from the bottom of the fluid chamber 20. Piston 26 also includes a lower piston annulus 36 and an upper piston annulus 38 which are respectively defined as the space between the piston side 28 and the lower boss 32, and the space between the piston side 28 and the upper boss 34. The upper piston annulus 38 seats (see FIGS. 3 and 4) therein a structural portion of a generally cylindrical actuator button, generally illustrated as 40. The actuator button 40 has a structure defining a piston seating member 42 having a recess 44 for receiving the upper piston boss 34 as the piston seating member 42 seats within the upper piston annulus 38. The actuator button 40 is also formed with an actuator annulus 46 (see FIGS. 3 and 4) between the piston seating member 42 and the inside of the actuator button 40. The actuator annulus slidably (in operation of the invention) received therein the top of the side and a structural portion of the side (see FIG. 4) of the fluid chamber 20 as the actuator button is depressed.

Figure 12:
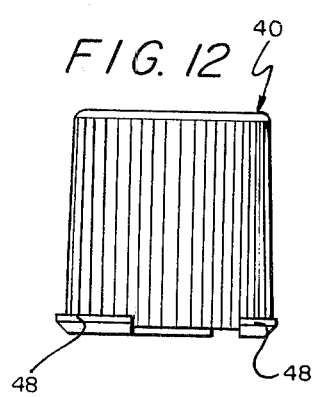
FIG. 12 is a side elevational view of the actuator button.
Figure 13:
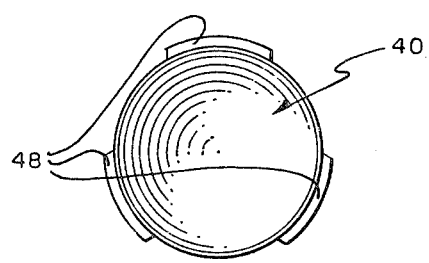
FIG. 13 is a top plan view of the actuator button.

Actuator button 40 is additionally formed with a plurality of partially protruding ridges 48-48-48 (see FIGS. 12 and 13) which provide the opportunity for the actuator button 40 to be locked in an upper non-depressed position (see FIG. 3) or in a lower depressed position (see FIG. 4) when the ridges 48-48-48 lodge within the notched recesses 17-17 (see FIG. 5) of the cylindrical side 18 of the pump housing 16.

A bottom plug 50 engages the bottom of the pump housing 16. Plug 50 includes plug valve vents 52-52, plug shoulder 54 for sealing and mating with the top of neck 14 of receptacle 12, a plug intage port 56, and a depending conduit boss 58 that extends axially downward and is in communication with the plug intake port 56.

A removable tube 60 removably engages the conduit boss 58 to reach nearly to the bottom of the receptacle 12 with which the pump 10 is associated for communication with the fluid product therein for the flow of the fluid from the receptacle 12 into the fluid chamber 20 of the pump housing 16 for dispensation through the discharge passage 21 of the discharge spout 19.

Figure 9:
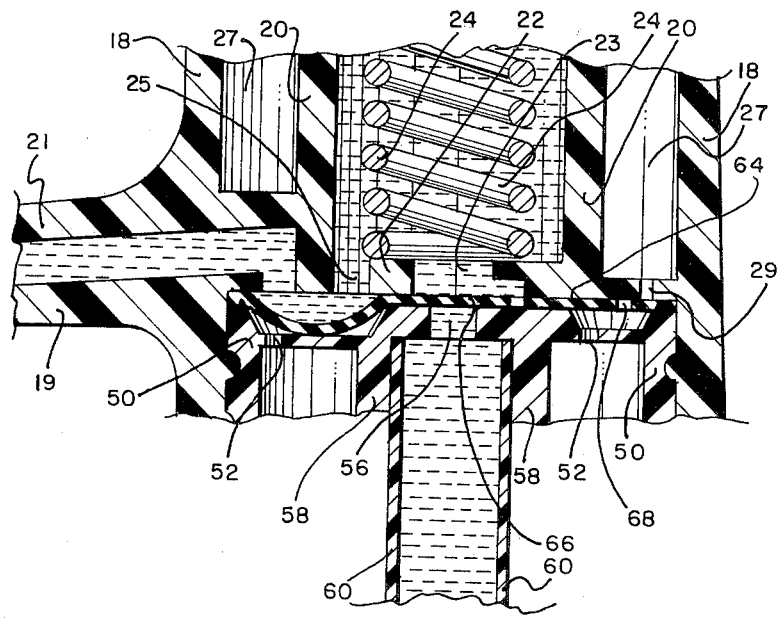
FIG. 9 is a partial enlarged vertical sectional view illustrating the diaphragm bulging to dispense fluid through the spout.

A cylindrical skirt 62 rotatably lodges between the bottom of the pump housing 16 and the plug shoulder 54 and is internally threaded (or otherwise adapted) for application to the open neck 14 of the receptacle 12. A diaphragm 64 (see FIG. 7) is positioned between the bottom plug 50 and includes a flap valve 66 and vent opening 68. Flap valve 66 pivotally covers the bottom plug intake port 56, and the diaphragm 64 (when not expanded) seals the discharge port 25 of the fluid chamber 20 and prevents the communication of the discharge port 25 with the discharge passage 21 fo the discharge spout 19 when the fluid chamber 20 is not substantially full with the fluid product and the actuator button 40 is not depressed (see FIGS. 3 and 8). When the fluid chamber 20 becomes substantially full and the actuator button 40 is depressed, flap valve 66 closes from the pressure of the downward force of the actuator button 40 on the piston 26 and on the fluid product within the fluid chamber 20 and the pressurized fluid in the fluid discharge port 25 buldges the diaphragm 64 at this point (see FIG. 9) and enables the fluid to flow from the fluid chamber 20 through the discharge port 25 into the discharge passage 21 of the discharge spout 19. When the actuator button 40 is in the process of returning to its upper position by the force of the upwardly biasing spring coil 24 against the bottom of piston 26 (which in turn biases the button 40 in the same direction), there is no downward force of the actuator button 40 on the fluid product and the diaphragm 64 subsequently seals off the communication of the discharge port 25 and the discharge passage 21 simultaneously to the rising upwardly biased piston 26 opening the flap valve 66 of the diaphragm 64 and drawing liquid through removable tube 60, through intake port 56 and the opened flap valve 66 and through fluid intake port 23 into the fluid chamber 20.

Figure 10:
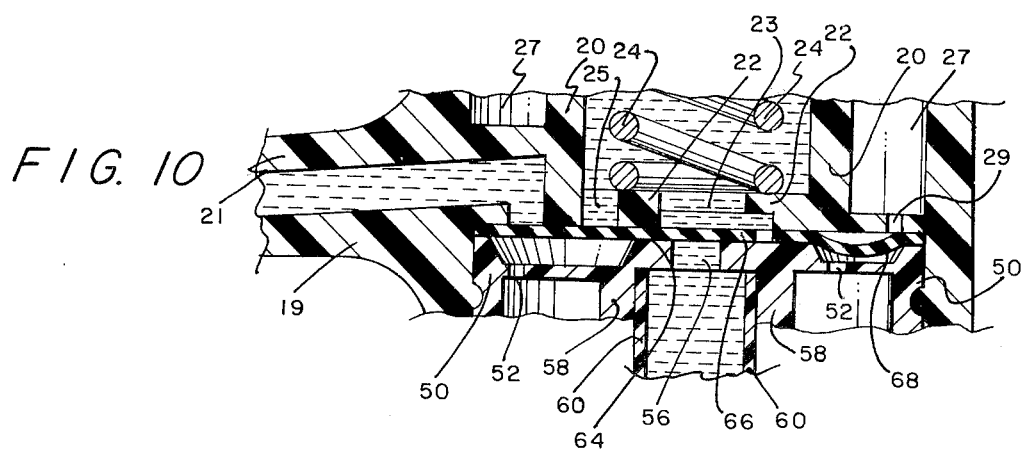
FIG. 10 is a partial enlarged vertical sectional view illustrating the diaphragm bulging for venting purposes.

When the actuator button 40 is substantially biased (not necessarily entirely) to its utmost upper position and the fluid chamber 20 is substantially full again, diaphragm 64 automatically vents the inside atmosphere of the receptacle 12. Diaphragm 64 seals the annulus venting port 29 when the pressure in the receptacle 12 is atmospheric or above (see FIGS. 3, 4, 8 and 9). Venting is accomplished when the pressure within the receptacle 12 is below atmospheric (and atmospheric or above in the annulus 27) which causes the diaphragm 64 to bulge away (see FIG. 10) from the annulus venting port 29 and opens up communication between the venting port 29 and the plug valve vent 52 via the diaphragm vent 68 to equalize the pressure between the receptacle 12 and the pump housing 16. The entire process may subsequently be repeated with another downward thrust of the actuator button 40 which again closes flap valve 66 and again bulges the diaphragm 64 in accordance with FIG. 9 to again discharge fluid product through the discharge passage 21 of discharge spout 19. Actuator button 40 may be locked either in the uppermost position or in the lowermost position (for transportation purposes) by rotation of the actuator button 40 to lodge one or a number of ridges 48-48-48 within one or a number of notched recesses 17-17 (see FIG. 5) of the cylindrical side 18 of the pump housing 16.

While the present invention has been described herein with reference to a particular embodiment thereof, a latitude of modification, various changes and substitutions are intended in the foregoing disclosure, and it will be appreciated that in some instances some features of the invention will be employed without a corresponding use of other features without departing from the scope of the invention as set forth.

I claim:
1. A pump for removing and dispensing liquid from a receptacle comprising;
(a) a pump housing having a generally cylindrical side, and including a structure defining an essentially cylindrical fluid chamber, a pump annulus interposed between the cylindrical side and the fluid chamber, a discharge spout having a discharge passage and formed integrally with the pump housing, said fluid chamber having a bottom evidencing a fluid intake port and a fluid discharge port;

(b) spring biased means housed within said fluid chamber;

(c) a piston with a piston side that snugly slidably traverses the inside wall of the cylindrical fluid chamber, said spring biased means engaging the bottom of the piston for biasing the piston away from the bottom of the fluid chamber;

(d) a generally cylindrical actuator button supported by the top of said piston;

(e) a bottom plug engaging the bottom of the pump housing and including a structure evidencing at least one plug valve port, at least one vent port, a plug shoulder for sealing and mating with the top of the receptacle, a bottom plug intake port, and a depending conduit boss that extends axially downward and is in communication with the bottom plug intake port;

(f) a removable tube of sufficient length removably engaging the conduit boss to reach nearly to the bottom of the receptacle with which the pump is associated for communication with the fluid product therein for the flow of the fluid from the receptacle into the fluid chamber of the pump housing for dispensation through the discharge passage of the discharge spout;

(g) a cylindrical skirt rotatably lodging between the bottom of the pump housing and the plug shoulder and adapted for application to the open neck of the receptacle; and (h) a diaphragm means interposed between the bottom of the pump housing and the bottom plug, and structurally defining a diaphragm vent opening and a flap valve which pivotally covers the bottom plug intake port, said diaphragm means sealing the discharge port of the fluid chamber and preventing the communication of the discharge port with the discharge passage of the discharge spout when the fluid chamber is not substantially full with the fluid product and the actuator button is not depressed.

2. The pump of claim 1 wherein said bottom of said fluid chamber additionally defines a plurality of interconnecting partitions, said spring biased means being supported by the top of said partitions.

3. The pump of claim 2 wherein said piston is formed with a lower piston boss and an upper piston boss.

4. The pump of claim 3 wherein said lower piston boss is circumscribed by said spring biased means; said piston additionally having a structure including a lower piston annulus defined by the space between the piston side and the lower piston boss and an upper piston annulus defined by the piston side and the upper piston boss.

5. The pump of claim 4 wherein said upper piston annulus is seating therein a structural portion of said actuator button.

6. The pump of claim 5 wherein said actuator button has a structure defining a piston seating member including an actuator recess therein for receiving the upper piston boss as said piston seating member seats within said upper piston annulus.

7. The pump of claim 6 wherein said actuator button is formed with an actuator annulus between said piston seating member and the side of said actuator button, said actuator annulus slidably operationally receiving the top of the side and a structural portion of the side of said fluid chamber therein as said actuator button is depressed.

8. The pump of claim 7 wherein said pump housing structurally provides the opportunity of said actuator button to be locked in an upper non-depressed position or in a lower depressed position.

9. The pump of claim 8 wherein the pump annulus has a button formed with an annulus venting port, said diaphragm means sealing the annulus venting port when the pressure in the receptacle is atmospheric or above and said diaphragm means being depressed and bulges when the pressure in the receptacle is below atmospheric causing communication between the annulus venting port and the diaphragm vent opening to provide for venting to the atmosphere through at least one plug valve port.

10. A process for removing and dispensing liquid from a receptacle through a discharge passage of a discharge spout formed integrally with a pump housing having a fluid chamber with a fluid intake port and a fluid discharge port, a pump annulus with an annulus venting port and defined as the space between the side of the pump housing and the fluid chamber, spring biased means housed within the fluid chamber and supporting and biasing upwardly a piston that snugly slidably traverses the inside wall of the cylindrical fluid chamber, an upwardly biased actuator button supported by the top of the piston, a bottom plug engaged to the bottom of the pump housing and formed with a plug shoulder and at least one plug valve port and a plug intake port and a depending conduit boss extending axially downward communicating with the plug intake port and including a removable tube attached thereto to reach nearly to the bottom of the receptacle, a cylindrical skirt rotatably lodging between the bottom of the pump housing and the plug shoulder and internally threaded for application to the open neck of the receptacle, the process comprising the steps of:

(a) interposing a diaphragm means between the bottom of the pump housing and the bottom plug to seal off the communication of the fluid discharge port of the fluid chamber and the discharge passage of the discharge spout, and to seal the annulus venting port, the diaphragm means has a structure defining a diaphragm vent opening and a flap valve which pivotally covers the bottom plug intake port;

(b) pushing repeatedly downward the upwardly biased actuator button to cause the upward movement of the upwardly biased piston to open the flap valve and draw liquid through the removable tube, the plug intake port, through the fluid intake port into the fluid chamber until the same is substantially full; and (c) pushing down the upwardly biased actuator button after the fluid chamber has become substantially full in accordance with step (b) to close the flap valve and depress the portion of the diaphragm means covering the fluid discharge port to bulge the diaphragm means in order to open up communication between the fluid discharge port and the discharge passage to dispense liquid from the fluid chamber through the discharge passage.

11. The process of claim 10 additionally comprising venting the inside atmosphere of the receptacle by bulging the diaphragm means away from the annulus venting port to open up communication between the annulus vent port and the plug valve port via the diaphragm vent valve to equalize the pressure between the receptacle and the pump housing.

* * * * *